No. 889,486. PATENTED JUNE 2, 1908.
B. ROSS.
COLTER.
APPLICATION FILED DEC. 31, 1907.
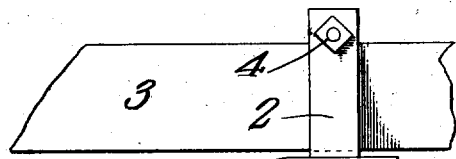
Fig. 1.
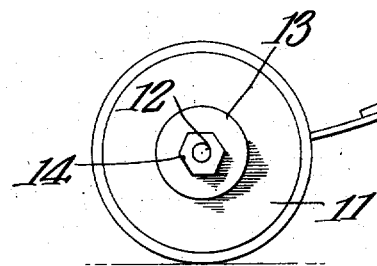
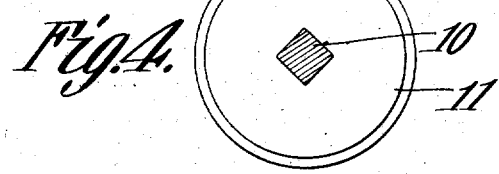
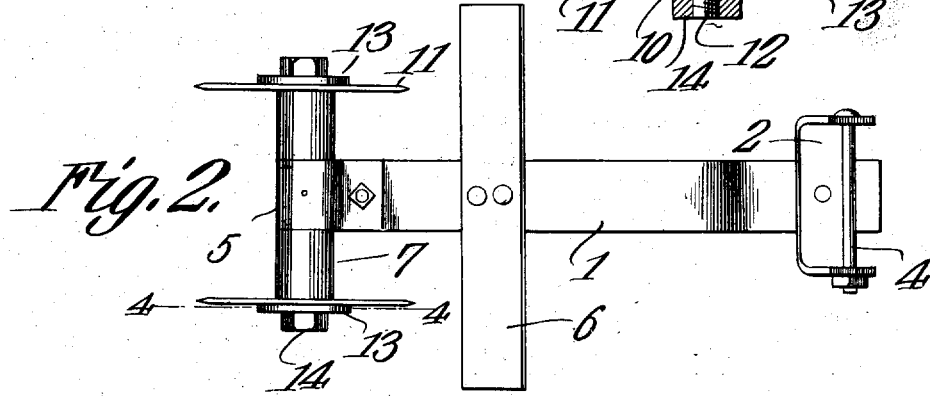
Inventor
Bernard Ross.
Witnesses
Attorneys

UNITED STATES PATENT OFFICE.

BERNARD ROSS, OF NEW ALBANY, INDIANA.

COLTER.

No. 889,486.  Specification of Letters Patent.  Patented June 2, 1908.

Application filed December 31, 1907. Serial No. 408,729.

*To all whom it may concern:*

Be it known that I, BERNARD ROSS, a citizen of the United States, residing at New Albany, in the county of Floyd and State of Indiana, have invented a new and useful Colter, of which the following is a specification.

This invention has relation to colters and it consists in the novel construction and arrangement of its parts as hereinafter shown and described.

The object of the invention is to provide a colter in the form of an attachment which may be easily and readily applied to the beam of a plow, potato digger or the like and which consists primarily of binary cutting disks mounted upon an axle which is journaled for rotation in a spring or resilient arm. The said arm is pivotally connected to a yoke which is adapted to be applied to the beam of the implement to which the colter is attached. A cross bar is attached to said arm in advance of the colter disks and axle and is adapted to bend down weeds and other vegetable growth so that the colter will not be forced out of contact with the sod and may effectually perform its function in cleaving the same. The axle is of novel formation as will hereinafter appear.

In the accompanying drawing: Figure 1 is a side elevation of the colter. Fig. 2 is a top plan view of the same. Fig. 3 is a side elevation of the axle showing the colter disks in section, and Fig. 4 is a transverse sectional view of the axle cut on the line 4—4 of Fig. 2.

The colter consists of the spring or resilient arm 1 which is pivotally connected at its upper end to the yoke 2. Said yoke is adapted to receive the implement beam 3 to which it is clamped by means of a bolt 4. The lower end of the arm 1 is formed into a bearing 5 and the said arm is provided at an intermediate point with the cross bar 6. The axle 7 is provided with an intermediate diametrically reduced portion 8 which is journaled in the bearing 5. The said axle is provided at the ends of the portion 8 with the shoulders 9 which bear against the ends of the bearing 5 and prevent longitudinal movement of the said axle with relation to the said bearing. The axle is provided at its end portions with the diametrically reduced non-circular portions 10 which enter correspondingly shaped perforations provided at the centers of the cutting disks 11. The portions 10 are a trifle short of being the same transverse thickness as the disks 11. The extremities of the axle 7 terminate in the concentric threaded portions 12 upon which are mounted the washers 13 and the nuts 14. The washers 13 bear laterally against the outer sides of the disks 11 and impinge the same against the intermediate portions of the shaft 7 of greatest diameter, while the nuts 14 bear laterally against the outer sides of the said washers. As a consequence of such an organization it is obvious that the axle 7 is caused to rotate in unison with the disks 11 and that through the said axle the said disk must rotate simultaneously. As the colter moves along the surface of the ground the cross bar 6 encounters the tall standing vegetable matter and presses the same down so that the said matter will permit the axle 7 to readily pass over the same without tending to lift the axle. Under the weight of the beam 3 the disks 11 are forced into the ground under the tension of the arm 1 and as the said disks move along the ground they cleave the sod.

By reason of the fact that the arm 3 is pivotally connected to the yoke 2 the implement to which the colter is attached may be readily turned at the end of the row without causing the colter attachment to sweep bodily in a lateral direction and thus constitute a means of obstruction at the turning point.

Having thus described my invention, what I claim as new and desire to secure by Letters-Patent is:

1. A colter attachment comprising an arm, means located at one end for connecting the arm to an implement, a colter disk mounted for rotation at the other end of the arm and a cross bar mounted upon the arm at a point intermediate of the ends thereof.

2. A colter attachment comprising an arm, means for connecting the same with an implement, a bearing located at the end of the arm, an axle having an intermediate diametrically reduced portion which is journaled in said bearing and being provided with non-circular diametrically reduced portions with concentrically arranged externally threaded extremities, disks having central openings which receive the non-circular portions of the axle and clamping washers and nuts mounted upon the threaded extremities of the axle and adapted to hold the disks in position upon the non-circular portions of the axle and in rigid relation with the axle.

In testimony that I claim the foregoing as my own, I have hereto affixed my signature in the presence of two witnesses.

BERNARD ROSS.

Witnesses:
JAMES H. BROOKS,
WILLIAM RADY.